(12) United States Patent
Wilson

(10) Patent No.: US 7,560,026 B2
(45) Date of Patent: Jul. 14, 2009

(54) TWO-STAGE ANAEROBIC DIGESTER

(76) Inventor: Keith Wilson, 125 Leland St. S., Thunder Bay, ON (CA) P7E 2N3

( * ) Notice: Subject to any disclaimer, the term of this patent is extended or adjusted under 35 U.S.C. 154(b) by 68 days.

(21) Appl. No.: 11/533,070

(22) Filed: Sep. 19, 2006

(65) Prior Publication Data

US 2007/0062866 A1    Mar. 22, 2007

Related U.S. Application Data

(60) Provisional application No. 60/717,770, filed on Sep. 19, 2005.

(51) Int. Cl.
*C02F 3/28* (2006.01)
(52) U.S. Cl. .................. 210/603; 210/179; 210/260
(58) Field of Classification Search .................. 210/603, 210/175, 179, 252, 259, 260
See application file for complete search history.

(56) References Cited

U.S. PATENT DOCUMENTS

| | | | |
|---|---|---|---|
| 2,867,521 A * | 1/1959 | Jeffreys ........................... 71/8 |
| 4,311,593 A | 1/1982 | Benjes et al. |
| 4,329,428 A | 5/1982 | Ghosh et al. |
| 4,350,588 A * | 9/1982 | Tsubota ...................... 210/208 |
| 4,521,310 A * | 6/1985 | Casey ......................... 210/603 |
| 4,722,741 A | 2/1988 | Hayes et al. |
| 4,735,724 A | 4/1988 | Chynoweth et al. |
| 4,780,415 A * | 10/1988 | Ducellier et al. ............ 435/166 |
| 5,096,579 A | 3/1992 | Jordan et al. |
| 5,500,123 A | 3/1996 | Srivastava |
| 5,525,229 A * | 6/1996 | Shih ........................... 210/603 |
| 5,534,437 A * | 7/1996 | Arrau ....................... 435/290.3 |
| 5,746,919 A | 5/1998 | Dague et al. |
| 5,942,116 A | 8/1999 | Clark et al. |
| 5,976,373 A | 11/1999 | Trocciola |
| 6,254,775 B1 | 7/2001 | McElvaney |
| 6,296,766 B1 | 10/2001 | Breckenridge |
| 6,299,774 B1 | 10/2001 | Ainsworth et al. |
| 6,342,378 B1 | 1/2002 | Zhang et al. |
| 6,368,500 B1 | 4/2002 | Asa et al. |
| 6,488,851 B1 * | 12/2002 | Almog ....................... 210/605 |
| 6,551,510 B1 | 4/2003 | Bakke et al. |

FOREIGN PATENT DOCUMENTS

| | | | |
|---|---|---|---|
| CA | 1140879 | | 2/1983 |
| CA | 2400538 | | 5/2003 |
| CA | 2461395 | | 10/2003 |
| DE | 3243103 | * | 5/1984 |
| JP | 4-225900 | * | 8/1992 |

* cited by examiner

*Primary Examiner*—Fred Prince
(74) *Attorney, Agent, or Firm*—Michael R. Williams; Ade & Company Inc.

(57) ABSTRACT

A digester processes animal waste and other organic matter by accelerating the natural bacterial process of digestion. This is achieved by constructing a system that mimics the natural physical dimensions and properties of a mammal's digestive tract and then accelerates the process through the selective breeding of aggressive bacteria to promote the digestion. Examples of suitable waste include but are by no means limited to animal waste, industrial waste, spent barley, kitchen waste and the like.

6 Claims, 4 Drawing Sheets

TWO-STAGE ANAEROBIC DIGESTER

PRIOR APPLICATION INFORMATION

This application claims the benefit of U.S. Provisional Application 60/717,770, filed Sep. 19, 2005.

BACKGROUND OF THE INVENTION

U.S. Pat. No. 5,746,919 teaches a temperature-phased anaerobic waste treatment process wherein waste is passed through a thermophilic biofilter first and then a mesophilic biofilter, wherein the biofilter media is made of random packed material or modular vertical or cross-flow media. Because of the use of the biofilter media, this process appears to be poorly suited for use with waste containing solid matter. Furthermore, a considerable input of energy is needed to heat cold waste to a thermophilic temperature range.

SUMMARY OF THE INVENTION

According to a first aspect of the invention, there is provided a waste digestion system comprising:
 a blend tank for blending a quantity of waste and heating the waste to a temperature suitable for mesophilic bacteria; and
 an anaerobic digester comprising:
   an inlet for receiving waste from the blend tank;
   a first chamber for digesting the waste at a mesophilic temperature;
   a second chamber for digesting the waste at a thermophilic temperature, said second chamber being in fluid communication with the first chamber;
   at least one discharge outlet for removing the waste; and
   an agitator for moving the waste from the first chamber to the second chamber.

DESCRIPTION OF THE PREFERRED EMBODIMENTS

Unless defined otherwise, all technical and scientific terms used herein have the same meaning as commonly understood by one of ordinary skill in the art to which the invention belongs. Although any methods and materials similar or equivalent to those described herein can be used in the practice or testing of the present invention, the preferred methods and materials are now described. All publications mentioned hereunder are incorporated herein by reference.

Described herein is a digester for processing animal waste and other organic matter by aiding and accelerating the natural bacterial process of digestion. As discussed below, this is achieved by constructing a system that mimics the natural physical dimensions and properties of a mammal's digestive tract and then accelerates the process through the selective breeding of aggressive bacteria to promote the digestion. Examples of suitable waste include but are by no means limited to animal waste, industrial waste, spent barley, kitchen waste and the like. Specifically, any material that is largely organic in character and can be digested by microorganisms can be digested in the instant digester, as discussed below.

In one embodiment, the system 1 comprises a blend tank 10 and a digester 20.

Figure 4:
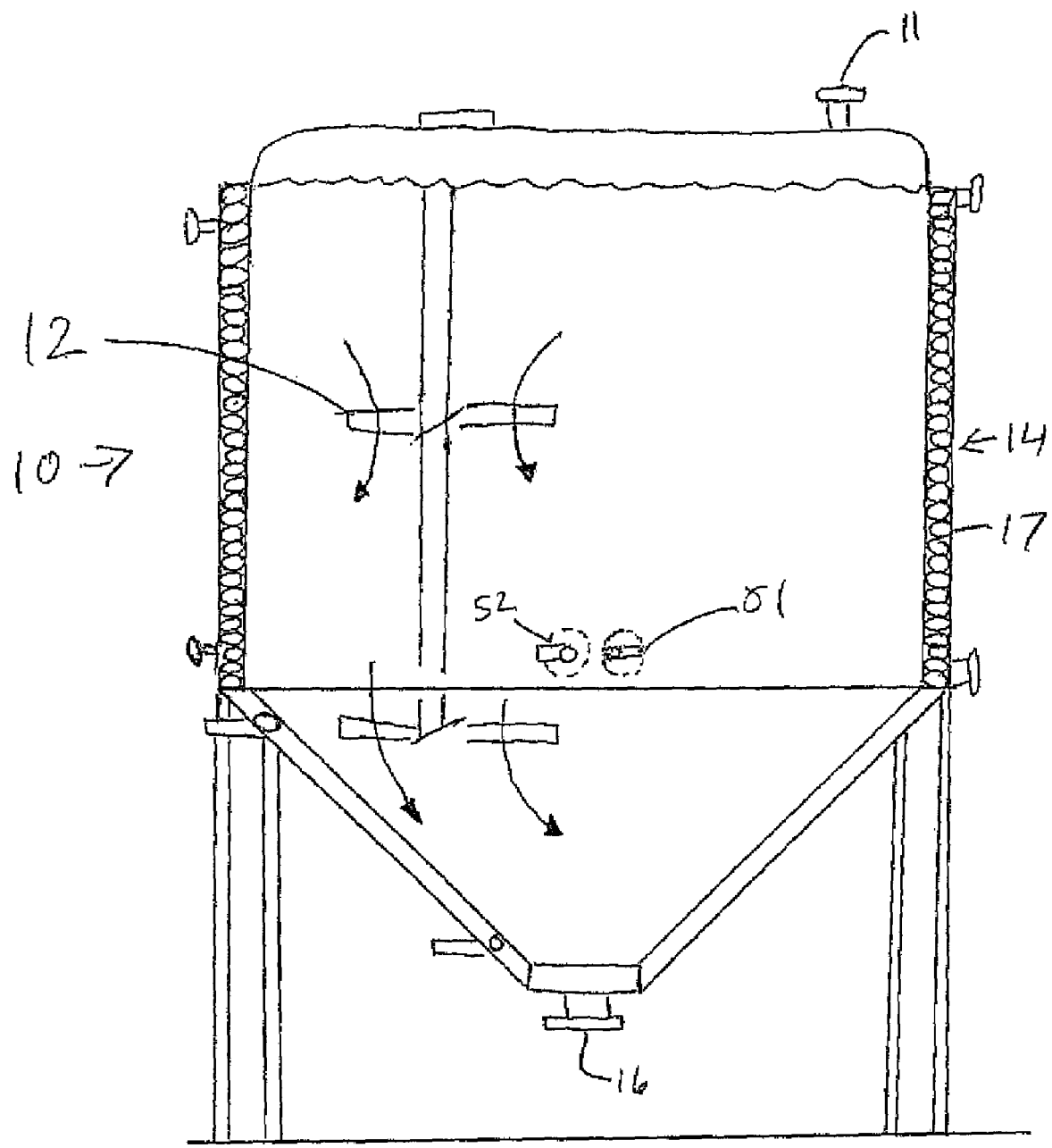
FIG. 4 is a side view of the blend tank.

The blend tank 10, shown in FIG. 4, mixes and heats the waste prior to transferring the waste to the digester 20, as discussed below. As discussed below, in some embodiments, the blend tank 10 receives pumped waste and includes a raw waste inlet 11, a top agitator 12, a heating system 14 and a waste discharge outlet 16 which transfers the blended and heated waste to the digester 20, as discussed below. The heating system 14 has a set point and shuts off when waste within the blend tank 10 reaches that temperature. In some embodiments, the heating system 14 is set to heat the waste to a temperature approximately 10% higher than the initial temperature in the digester 20, as discussed below.

In some embodiments, the heating system 14 comprises a heating jacket 17 arranged as a spiral helix around the exterior of the blend tank 10 in which water heated by methane generated by the digester 20 circulates, thereby heating the blend tank 10. In other embodiments, the heating jacket 17 is a double-spiral wherein heated water and heated digestate exiting the digester 20 are circulated in different spirals, as discussed below.

Figure 1:
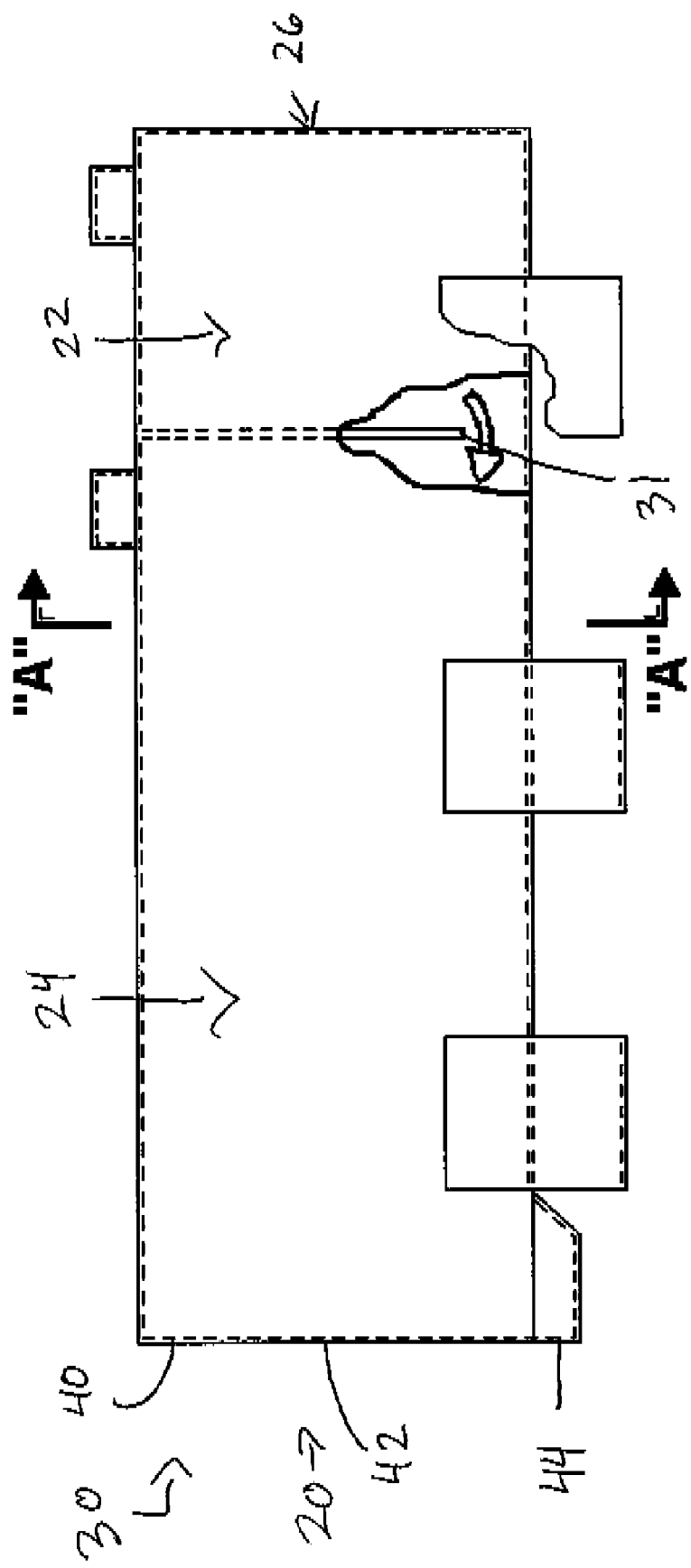
FIG. 1 is a side view of the digester
Figure 2:
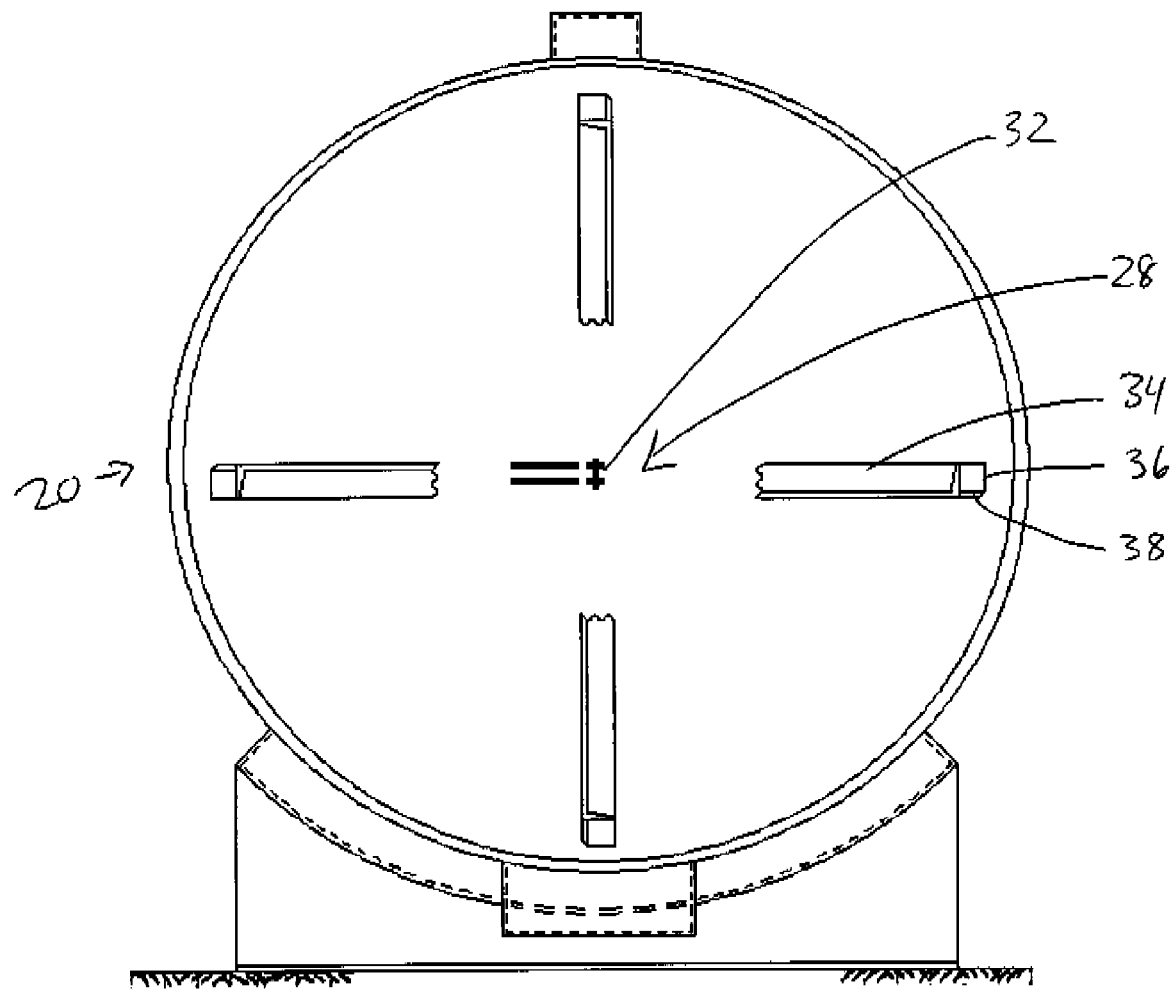
FIG. 2 is a cross-sectional view of the digester along line "A-A" in FIG. 1.

The digester 20 is shown in FIG. 2 and further comprises a mesophilic chamber 22, a thermophilic chamber 24, an inlet 26, an agitator 28 and at least one discharge outlet 30. It is of note that as discussed below, the digester 20 is elevated at one end such that there is a downward slope from the mesophilic chamber 22 to the thermophilic chamber 24.

The mesophilic chamber 22 and the thermophilic chamber 24 are separated by a bulkhead 31 that extends from the top of the digester to near the bottom so that flow of waste from the mesophilic chamber 22 to the thermophilic chamber 24 is controlled and the mesophilic chamber 22 and the thermophilic chamber 24 are in fluid contact with one another which is aided by the slope of the digester 20, as discussed below. Furthermore, the mesophilic chamber 22 and the thermophilic chamber 24 are heated by separate heating units, as discussed below.

The inlet 26 accepts heated and blended waste from the blend tank 10, as discussed below.

The agitator 28 comprises a horizontal shaft 32 mounted within the digester 20 and arms 34 mounted to the shaft 32 at intervals. The arms 34 have mounted thereto blades 36 which further include scrapers 38, as discussed below.

The discharge outlet 30 comprises a light solids outlet 40, a liquid outlet 42 and a heavy solids outlet 44.

In use, waste is blended and heated in the blend tank 10. The waste is then transferred to the digester 20 from the waste discharge outlet 16 of the blend tank 10 to the inlet 26 of the digester 20. As discussed below, the inlet 26 is arranged to be beneath the level of the waste in the digester 20, thereby minimizing the amount of air introduced into the digester 20 so that the interior of the digester 20 remains substantially anaerobic as discussed below. Furthermore, digested waste is removed from the digester 20 at the end of digester distal to the inlet 16 from one of the discharge outlets 30 at the same rate as heated waste is added. In this manner, the level of waste in the digester 20 remains substantially constant, as discussed below.

As discussed below, the waste is heated prior to addition to the digester 20 to a temperature within the mesophilic range and is added to the mesophilic chamber 22 within the digester 20. As discussed below, adding cold waste may effectively shock the ecosystem of the methanogenic bacteria within the digester 20, causing the bacteria to go dormant or enter stasis, thereby reducing the efficiency of the digestion process. The waste moves through the mesophilic chamber 22 and into the thermophilic chamber 24 as a result of the slope of the digester 20 and also by the action of the agitator 28 which is arranged to prevent settling of solids, promote gas release and reduce physical shock on the bacteria caused by the agitation process itself. As will be appreciated by one of skill in the art, in addition to rapid changes in temperature, physical trauma can also cause bacteria to enter stasis or dormancy. As discussed below, the agitator 28 is arranged to mix the waste in a manner that does not cause significant trauma to the bacteria, thereby promoting efficiency of digestion and gas evolution.

Different bacteria flourish at different temperature ranges and exist throughout nature. This digester 20 makes use of bacteria which are common in mammalian digestive tracts and which flourish at the mesophilic and thermophilic temperature ranges under anaerobic conditions. As is well known to one of skill in the art, the temperature ranges defined as mesophilic and thermophilic are somewhat variable and rely in some part on the growth conditions and the condition of the bacteria. However, accepted values are that the mesophilic range is approximately 36° C. to 42° C. and the thermophilic range is approximately 50° C. to 65° C. As discussed above, the digester 20 is substantially anaerobic and the amount of oxygen introduced into the digester 20 is minimized by having the inlet 26 below the level of the waste in digester 20 as methanogenic bacteria are most active in the absence of oxygen. These bacteria consume organic volatile solids, including each other. They excrete primarily methane and when they expire, they give off carbon dioxide. The total biogas produced is typically approximately 60% methane, 40% carbon dioxide and trace amounts of other gases.

As discussed above, processed waste is removed from at least one of the discharge outlets 30 at the same rate as waste is added at the inlet 26 of the digester 20. This keeps the total amount of waste in the digester 20 substantially constant. Furthermore, the digested waste that is removed can now be used for other purposes. Specifically, light solids removed from the light solids outlet 40 and heavy solids removed at the heavy solids outlet 44 may be blended together to form a high quality fertilizer or peat-like material. Liquid waste is removed from the digester 20 at liquid outlet 42 and may be used as a liquid fertilizer. It is of note that the combination of heat and anaerobic conditions effectively "pasturizes" the waste, that is, eliminates most aerobic pathogens so that on re-exposure to oxygen once digestion is complete, the end-products, whether solid or liquid, are substantially pathogen-free.

As discussed above and as will be apparent to one of skill in the art, if the mesophilic and thermophilic temperature ranges are not maintained, the bacteria may go dormant or expire, which in turn will cause digestion rates and gas production to fall off dramatically. Therefore, feeding the digester 20 cold raw product in large amounts has a severe negative effect on efficiency. Thus, preheating of the feedstock or waste and using a continuous feed rate of small amounts is crucial to avoiding thermal shock to the bacteria, as discussed above.

In some embodiments, the digester 20 comprises a substantially horizontal container with a length to diameter ratio of approximately 2:1 to 5:1. In a preferred embodiment, the length to diameter ratio is approximately 3.5:1. As discussed above, the digester 20 is divided by the internal bulkhead 31 into two chambers: the low temperature, primary mesophilic chamber 22 and the higher temperature, secondary thermophilic chamber 24. As discussed above, the mesophilic chamber 22 and the thermophilic chamber 24 are in direct fluid contact with one another and are separated by the bulkhead 31. In some embodiments, the secondary chamber has approximately four times the capacity of the primary chamber. Thus, as discussed below, the digester operates simultaneously and continuously in both the mesophilic and thermophilic temperature ranges. It is of note that useable biogas is produced by different methanogenic bacteria at both temperature ranges.

As discussed herein, the feedstock is pre-heated to the mesophilic temperature range or a temperature slightly above the mesophilic range to compensate for subsequent temperature loss during the transfer process before introduction into the primary compartment. Furthermore, the digester 20 is arranged such that the feed inlet 26 is below the level of liquid in the digester 20, thereby minimizing the introduction of air or oxygen into the chamber. As feedstock or waste is added to the digester 20, digestate is simultaneously unloaded at the other end of the digester via at least one of the discharge outlets 30, thereby maintaining a constant liquid level and internal gas pressure. The inlet 26 is positioned so that the feedstock residence time in the primary mesophilic chamber 22 is maximized before entering the secondary thermophilic chamber 24. Throughout this residence time, the temperature of the feedstock is moving from the mesophilic to the thermophilic range.

As will be appreciated by one of skill in the art, the exact amount of waste or feedstock that can be processed by the system 1 will depend on the dimensions of the digester 20.

In a preferred embodiment, the system 1 is arranged such that incoming waste spends approximately 1 day in the blend tank being mixed and heated to a mesophilic temperature, 1 day in the mesophilic zone or mesophilic chamber 22 of the digester 20 before passing beneath the bulkhead 31 and into the thermophilic zone or thermophilic chamber 24 where it takes the waste approximately 4 days to travel the length of the thermophilic chamber to the discharge outlets 30. It is of note that these time periods are approximations, and longer or shorter time periods may be used, depending upon the nature of the waste and the size and dimensions of the digester 20.

In addition to requiring a temperature controlled anaerobic environment, the bacteria also require a method of moving to new food sources or having the food brought to them. Therefore, the digester 20 has an agitator 28, which, as discussed above, also aids in preventing temperature stratification.

In some embodiments, the agitator 26 extends along substantially the full length of the digester 20 and has a central horizontal shaft 32 concurrent with the centerline of the digester 20. There are radial arms 34 that extend from the shaft 32 at regular intervals. As discussed above, the arms 34 support the longitudinal blades 36, which run the full length of the digester. The complete structure is of a bridge truss design to allow supports at the ends only. As a result of this arrangement, the shaft 32 remains rigid so that there is no sagging of the shaft 32. As discussed herein, the parts of the agitator 28 are arranged to be proximal to but not touch the walls of the digester 20, and any sagging of the shaft 32 could result in damage to the digester 20 or agitator 26. Therefore, the bearings are mounted externally at the ends of the digester 20 and there are no internal wearing parts. The agitator 26 includes a large rotating disc mounted to the shaft 32 to seal the region of the bulkhead 31 which the shaft 32 passes through. There are thrust bearings mounted at either end of the centre shaft to counter act any horizontal forces generated by the 2° slope of the machine. They are also used to centre the agitator 28 within the digester 20.

Figure 3:
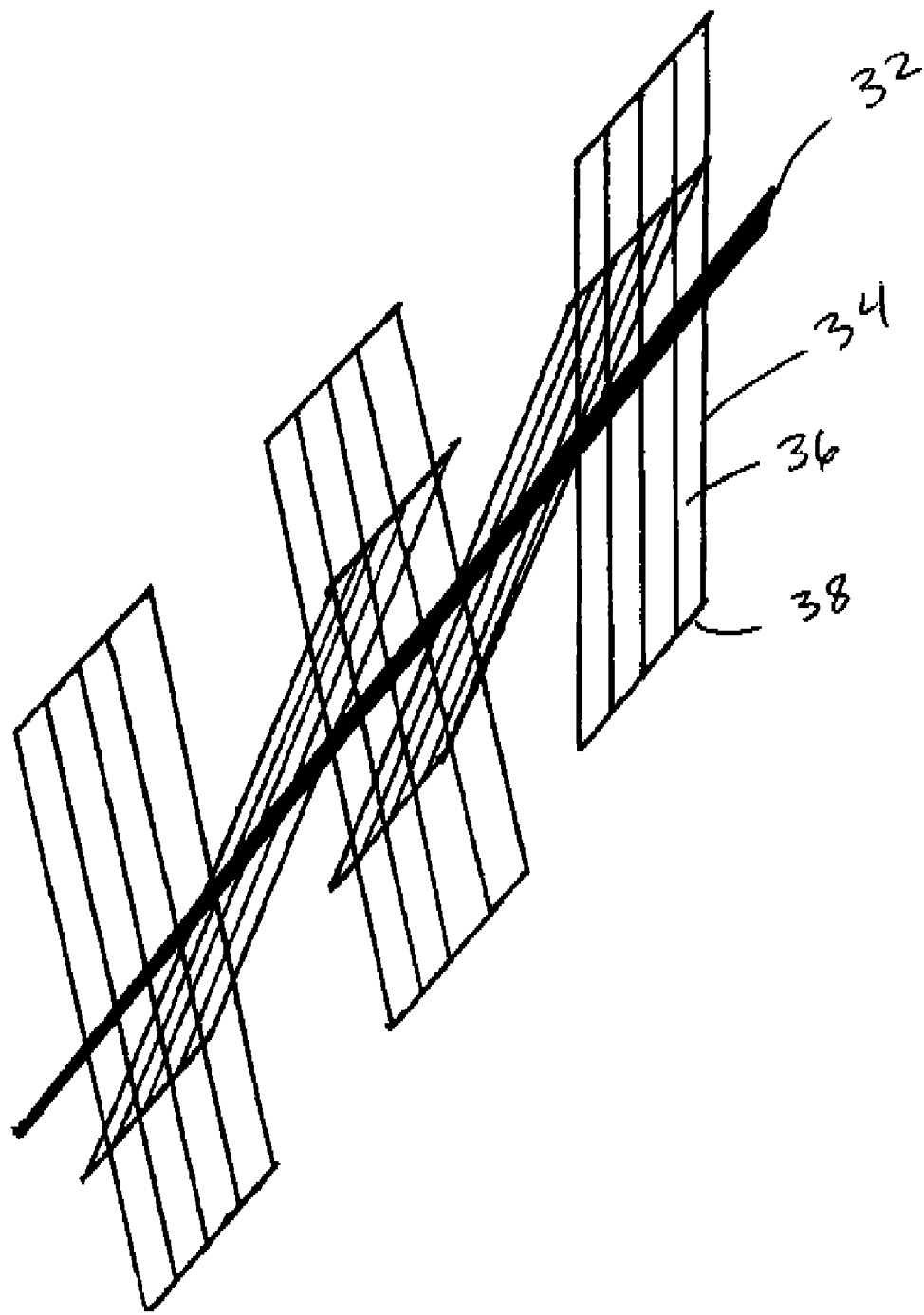
FIG. 3 shows the structure of the agitator.

Within the digester 20, there is a natural vertical stratification of material. That is, there are light solids forming a crust, a liquid central volume and heavy solids on the bottom. In a preferred embodiment, the longitudinal blades 36 of the agitator 28 are segmented in such a way to balance the variable torque required to push through solids or liquids, as shown schematically in FIG. 3. Also attached to the blades 36 are small individual scrapers 38 that are positioned to slowly move the heaviest solids along the bottom. This process is aided by installing the whole digester container on a slope, for example, a 0.5°-10° slope, preferably a 1°-5° slope, or in a preferred embodiment, a 2° slope, with the infeed end being the highest. At the discharge end of the digester is a box 40 attached to the bottom of the container to receive the heaviest solids after they have transited the full length of the digester 20. As discussed above, there are three discharge outlets on the end of the digester: the light solids outlet 40, the liquid outlet 42 and the heavy solids outlet 44.

In some embodiments, the agitator 28 is rotated by a rachet and pawl assembly, which is powered by an air cylinder. A variably timed solenoid valve controls the cylinder. By adjusting the timed values, the intensity of the agitation can be varied. Also, if more torque is required, the air pressure is raised. It is of note that the agitator 26 is arranged to agitate the waste digesting in the digester 20 such that a solid content of less than 25%, preferably less than 20%, more preferably between 10-15% is maintained. In some embodiments, the agitator blades 36 move approximately 30° around the circumference of the digester 20 with every stroke, then stop. In these embodiments, there may be a spring-loaded secondary pawl, which acts as an anti-rollback device. There is a drive at both ends of the digester 20 to minimize the torque on the assembly. As will be appreciated by one of skill in the art, if the agitation is too slow, the solids will accumulate and the agitator will stall. If the agitation is too violent the bacteria, which are also susceptible to mechanical shock, will become dormant.

As the agitator 28 revolves, the longitudinal blades 36 pass through the different layers at different times. It is possible for the blades 36 to simultaneously engage a thick crust and the heavy solids at the bottom, thereby stalling the drive mechanism. This necessitates a heavier structure and higher power consumption to compensate for this increased peak torque load. To minimize this required torque, there is provided a staggered longitudinal blade arrangement, shown in FIG. 3, so that only a short position of any blade, at any one time, is engaged in heavy solids or crust. This removes the peaks in torque loads and therefore lowers the design requirements for the drive and the agitator 28 as a whole. Furthermore, as these longitudinal blades 36 lift up through the crust, this allows the gases to vent. Also the broken and wetted crust is now easier to decant.

As discussed above, the agitator blades 36 must pass close to the bottom of the digester 20 to sweep this area clean. However, care must be taken that the agitator 26 does not come in contact with the shell of the digester 20 at any point in its rotation. By mounting the main shaft of the agitator 2" below the centerline of the digester 20, different clearances between the shell and the agitator 28 can be achieved.

As discussed above, the scrapers 38 are mounted to the main longitudinal blades to move the solids. In some embodiments, the blades 36 are positioned so that they are 3" away from the bottom of the digester 20. In these embodiments, the scrapers 38 are 2" high scrapers 3" long. They are mounted to the blades 36 such that their extreme edges are 1" away from the bottom of the digester 20. Due to the vertical offset of the main shaft 32, there will be approximately 2" clearance on the sides of the digester 20 and 3" at the top of the digester 20. The scrapers 38 are mounted on a 45° angle, so that they will push the solids forward as the agitator 28 rotates. Therefore, in one revolution of the agitator 28, the solids will progress approximately 1.5" toward their eventual exit point, the heavy solid outlet 44.

As discussed above, it is important to remember that the above dimensions are for illustrative purposes and other dimensions, sizes and clearances may be used within the scope of the invention.

As discussed above, methanogenic bacteria, when subjected to violent movement or mechanical shock, go dormant for hours. Therefore, to maintain efficiency, the agitation process must be slow and gentle. Recirculation pumping and propeller agitators have proven to be too aggressive. In a preferred embodiment, a large "squirrel cage" design with a slow and/or intermittent action of approximately 1 or 2 RPM is used, although other suitable arrangements which minimize the mechanical shock to the bacteria may also be used. The typical drive for these agitators consists of an electric motor and speed reduction device (gearbox, chain and sprocket, etc.). However, due to the torque required for such a slow speed drive, this quickly becomes an expensive design.

Occasionally, the agitator 28 will face inertial resistance due to solids build up on the blades 36, and will counter rotate at the end of the agitation cycle. This will force a conventional (non-braked) drive backwards causing considerable stress. In a preferred embodiment, incorporated into the drive assembly is a secondary pawl that engages the ratchet at the end of the cylinder stroke. This stops the agitator 28 from rotating backwards.

Consequently, an expensive drive (with a fixed speed ratio) is replaced with a relatively inexpensive and infinitely variable drive.

As the scrapers 38 engage the solids in the digester 20 and move them along the bottom to their exit, a reaction force is created. This force will push the agitator centre shaft 32 horizontally towards the infeed end or inlet 26. This will misalign the agitator drive and eventually jam the agitator 28 internally against the end of the digester 20. To counteract this force, there is provided a thrust bearing. It consists of an HDPE or nylon "hockey puck" externally mounted at the end of the centre shaft. It bears against a polished surface of the ratchet drive assembly and the mounting is adjustable for wear. Another thrust bearing is mounted at the other end of the digester so that they can be used simultaneously to centre the agitator assembly within the digester 20.

As discussed above, the bulkhead 31 may be a bulkhead divider between the two chambers arranged so as to allow underflow of liquid and solids only. As a result of this arrangement, separate collection of gas from the two chambers is possible. Because of the expiration of the mesophilic bacteria in the primary chamber, a higher percentage of carbon dioxide is produced in this chamber. Concurrently, a higher percentage of methane is produced and collected from the secondary chamber. Therefore, the design and positioning of the interior bulkhead 31 allows progressively staged heating of the feedstock for a more efficient digester system 1. It also allows a higher percentage of methane to be recovered from the digestion process.

In a preferred embodiment, the digester 20 is heated by two water jackets around the bottom 120° of the circumference of the digester 20. There are separate water jackets to match the two internal digester chambers, that is, one for the mesophilic chamber 22 and one for the thermophilic chamber 24. The water jackets are divided in two with a lateral bulkhead positioned under the internal bulkhead. Therefore, the primary and secondary chambers have separate temperature capabilities and controls. This allows temperature maintenance of the thermophilic process in the secondary chamber while increasing the temperature in the primary chamber from mesophilic to thermophilic.

The water jackets have a series of longitudinal dividers that direct the heated water back and forth along the full length of each chamber allowing maximum heat transfer. These longitudinal dividers also act as stiffeners for the digester 20. This prevents the digester 20 from deforming under load and impeding the rotating internal agitator 28. These dividers are also of sufficient strength to transfer the weight of the digester 20 through the water jacket to the saddle supports.

As discussed above, the methanogenic bacteria in anaerobic digesters are susceptible to thermal shock and will slow down their food intake and their consequent excretion of methane gas. They may become completely dormant or even expire. Care must be taken to minimize this thermal shock when introducing fresh feedstock by pre-heating the incoming feedstock to a temperature as close as possible to that of the mesophilic chamber. Then the feedstock must be introduced at a slow, steady, continuous rate into the digester 20. This procedure becomes especially critical when operating a digester 20 at the thermophilic range in a cold climate.

To minimize heat loss, the exterior of the digester may be coated with suitable insulating material, for example, blown-foam insulation. Due to the absence of oxygen in the process, internal corrosion will be minimal and interior coating or protection of the digester is not required.

As discussed above, the waste is pre-heated in a blend tank 10 prior to being added to the digester 20. In one embodiment, the continuous feedstock pre-heat and blend tank 10 is a vertical cylinder with a conical bottom having an included angle of 90° to aid drainage of solids. The volume may be equal to 120% of the anaerobic digester primary mesophilic chamber. The tank is totally enclosed and vented to allow collection of the gases produced during the pre-heat stage. The discharge outlet 16 at the apex of the cone allows dumping of the solids built up in the cone, through a large bore horizontal gate valve. There is a recirculation pump which also transfers the feedstock to the digester 20 from the recirculation outlet 51 to the recirculation inlet 52 upon demand. There is a vertical, twin impeller agitator 12 mounted through the top of the tank 10. The agitator 12 operates as required, in conjunction with the recirculation pump, to suspend the solids and to facilitate heat transfer from the exterior heating jacket to the tank 10 contents. The exterior heating jacket reclaims heat energy leaving the site to heat up the cold incoming feedstock. The heating jacket is of a double-walled construction of the tank. A boiler, turbine or generator, fuelled by the methane produced in the anaerobic digester supplies the hot water.

All exterior surfaces of the tank are insulated with a blown foam insulation to allow maximum heat retention. All interior surfaces of the tank are coated with a corrosion resistant medium.

To prevent settling of the solids and to aid in heat transfer from the heating jacket, there is a pump in the blend tank 10 which re-circulates the raw feedstock at timed intervals. This pump also sends the contents to the digester on demand. The pump suction recirculation nozzle is horizontal and located tangentially on the vertical side of the tank, just above the top of the conical tank bottom cone of the tank. The pump discharge nozzle is also horizontal and located tangentially on the cone, ⅓ of the way up from the bottom apex. The pump suction and discharge nozzles are located 180° opposite to each other. The velocity of the pump discharge in the bottom of the tank cone ensures a swirling "toilet bowl" effect, which keeps the solids in suspension. When transferring the tank contents to the digester 20, the pump suction switches to the valve at the bottom apex of the cone.

On the vertical straight tank sides, these double walls contain piping through which hot liquid digestate is pumped from the digester on its way to storage. The piping is rolled around the tank circumference, stacked vertically in a continuous helical coil and welded in place. The outer skin is then attached and watertight welded. The digestate inlet is on the top coil and the outlet is on the bottom coil. When supplemental heat is required, hot water is pumped in the opposite direction in the gap between the coils. Thus, the inlet is between the bottom coils and the outlet is between the top coils.

It is of note that if additional heating capacity is required or if the tank has short vertical walls due to site headroom limitations, the cone may be double-walled. The digestate piping is then rolled in a spiral helix, which is then formed to the conical shape required. The outer shell is then added to contain the hot water.

In this manner, the energy in the hot digestate going to storage can be reclaimed and transferred to the cold incoming feedstock.

Excess biogas is consumed in a hot water boiler and heat is produced. If the heat produced is excess to the demands of the system, then it is dissipated by the idle generator cooling radiators. As will be appreciated by one of skill in the art, excess heat is easier to dispose of than excess biogas.

While the preferred embodiments of the invention have been described above, it will be recognized and understood that various modifications may be made therein, and the appended claims are intended to cover all such modifications which may fall within the spirit and scope of the invention.

The invention claimed is:

1. A waste digestion system comprising:
    a blend tank for blending a quantity of waste and heating the waste to a temperature suitable for mesophilic bacteria; and
    a horizontal anaerobic digester comprising:
        a first chamber within the digester, said first chamber arranged for digesting the waste at a mesophilic temperature;
        a second chamber within the digester, said second chamber arranged for digesting the waste at a thermophilic temperature;
        a bulkhead separating the first chamber and the second chamber so that the waste in the first chamber and the waste in the second chamber are in fluid contact, said bulkhead being arranged to allow underflow of liquid and solids only from the first chamber to the second chamber;
        an inlet for receiving waste from the blend tank into the first chamber
        at least one discharge outlet for removing the waste from the second chamber; and
        an agitator for moving the waste from the first chamber to the second chamber,
    said digester being arranged to be elevated at one end such that there is a downward slope from the first chamber to the second chamber.

2. The system according to claim 1 wherein the first chamber is arranged to be heated to a temperature between approximately 36° C. to 42° C.

3. The system according to claim 1 wherein the second chamber is arranged to be heated to a temperature between approximately 50° C. to 65° C.

4. The system according to claim 1 wherein the digester has a length to diameter ratio of approximately 2:1 to 5:1.

5. The system according to claim 1 wherein the slope is 0.50 to 100.

6. The system according to claim 1 wherein the slope is 1° to 5°.

* * * * *